United States Patent [19]

Tobinaga

[11] 4,358,570

[45] Nov. 9, 1982

[54] BINDER COMPOSITION FOR FOUNDRY SAND MOLDS

[75] Inventor: Takeshi Tobinaga, Yokkaichi, Japan

[73] Assignee: Mitsubishi Petrochemical Company Limited, Japan

[21] Appl. No.: 187,746

[22] Filed: Sep. 16, 1980

[30] Foreign Application Priority Data

Sep. 28, 1979 [JP] Japan ............................... 54-125128

[51] Int. Cl.$^3$ ..................... C08G 18/76; C08G 18/30
[52] U.S. Cl. .................................. 525/456; 521/117; 523/143; 525/504; 528/67; 528/49
[58] Field of Search .................. 260/DIG. 40, 33.4 P; 528/49, 67; 521/117; 525/456, 504; 523/143

[56] References Cited

U.S. PATENT DOCUMENTS

| | | | |
|---|---|---|---|
| 3,409,579 | 11/1968 | Robins | 260/DIG. 40 |
| 3,494,880 | 2/1970 | Austin | 521/117 |
| 3,676,392 | 7/1972 | Robins | 260/DIG. 40 |
| 3,702,316 | 11/1972 | Robins | 260/DIG. 40 |
| 3,726,867 | 4/1973 | Robins | 260/DIG. 40 |
| 4,079,031 | 3/1978 | Sardessai et al. | 260/DIG. 40 |

*Primary Examiner*—H. S. Cockeram
*Attorney, Agent, or Firm*—Robert E. Burns; Emmanuel J. Lobato; Bruce L. Adams

[57] ABSTRACT

A binder composition for foundry sands comprises (a) a polyisocyanate compound (e.g., polymethylene polyisocyanate), (b) a polyol compound (e.g., a polyol compound having as its principal constituent a polyether polyol of being at least bifunctional), and (c) an alkylphenol and/or an alkylphenol derivative (e.g., nonylphenol). In this binder composition, the equivalent weight ratio of the isocyanate group of component (a) and the hydroxyl group of component (b) is from 0.3:1 to 3:1, and the quantity of component (c) is 3 to 150 parts by weight relative to 100 parts by weight of the sum of the quantities of components (a) and (b).

9 Claims, No Drawings

BINDER COMPOSITION FOR FOUNDRY SAND MOLDS

BACKGROUND OF THE INVENTION

This invention relates to binder compositions having self-hardening properties at room temperature for foundry (or molding) sands for metal-casting molds.

In the foundry industry, binder compositions for producing sand molds are extremely useful and important.

Heretofore, inorganic and organic binders (bonding materials) have been used in sand molds for metal casting. In all of these binders, however, there are advantages and drawbacks, and a fully satisfactory binder has not yet been found.

Representative known methods of hardening foundry sand in which inorganic binders are used are:

1. the method in which water glass is caused to be in a state of adhesion to and on the surfaces of the sand particles, and carbon dioxide gas is blown into the sand thereby to cause it to harden;
2. the method in which water glass and calcium silicate are blended with the sand and caused to harden; and
3. the method in which a cement is blended with the sand, and water is further added to cause a hydration reaction thereby to cause hardening.

All of these methods, however, have been accompanied by the problem of poor breakability of the foundry sand mold, at the time when a casting is being taken out therefrom after the casting has been made by pouring molten metal such as iron or aluminum into the mold, whereby the work efficiency is greatly lowered.

On the other hand, an orgnaic binder, based on a furan resin is known. In the use of this binder, a mixture of a condensation product of furfuryl alcohol-formaldehyde and a condensation product of ureaformaldehyde is caused to harden in the presence of a strong acid such as para-toluenesulfonic acid or phosphoric acid. The hardening speed of the resin is easily affected by the ambient temperature, and the hardening is especially slow in winter. Furthermore, since a strong acid is used, defective hardening tends to occur depending on the kind of sand, as for example, in the case where seashores and is used.

In addition, a binder comprising a mixture of a polyol compound having two or more hydroxyl groups and a polyisocyanate compound having two or more isocyanate groups is known. Binders of this group are disadvantageous in that it is difficult to obtain strong binders because of the poor compatibility or solubility, in general, between the polyol compounds and the polyisocyanate compounds.

Accordingly, in order to improve the compatibility between a polyisocyanate compound and a polyol compound thereby to produce a strong binder, the combined use of a polyol compound containing tertiary nitrogen atom has been proposed. The use of such a compound, however, gives rise in some cases to problems such as casting defects, including blow holes due to the increased content of nitrogen in the binder and a shortening of the work time of the binder mixture due to the catalytic action of the tertiary nitrogen atom.

SUMMARY OF THE INVENTION

It is an object of this invention to solve the above described problems by using, in a binder composition for foundry sands, alkylphenol and/or derivatives thereof as a promoter of compatibility between a polyol compound and a polyisocyanate compound in the binder composition.

According to this invention, briefly summarized, there is provided a binder composition for foundry sands comprising: (a) a polyisocyanate compound; (b) a polyol compound; and (c) an alkylphenol and/or an alkylphenol derivative.

By the use of the binder composition of this invention, there are afforded a number of advantageous features such as: long work time; easy control of the work time, the speed of development of the binder strength after hardening, and other results when a catalyst is used; absence of casting defects such as blow holes because of the small nitrogen content in the binder; and good breakability of the sand mold thereby produced at the time when the cast article is taken out of the mold.

A further feature of the binder composition of this invention is that it is of lower price than other organic binder compositions.

The nature, utility, and further features of this invention will be apparent from the following detailed description beginning with a consideration of general aspects of the invention and concluding with specific examples of practice constituting preferred embodiments thereof.

DETAILED DESCRIPTION OF THE INVENTION

Polyisocyanate compound

The polyisocyanate compound, which is the component (a) used in this invention, is appropriately selected from polyisocyanate compounds widely used as starting materials for polyurethanes. Di- or triisocyanates are preferable. Examples of suitable polyisocyanate compounds are: aliphatic isocyanates such as hexamethylene diisocyanate; alicyclic isocyanates such as 4,4'-dicyclohexylmethane diisocyanate and isophorone diisocyanate; aromatic polyisocyanates such as 2,4- and 2,6-tolylene diisocyanate, diphenylmethane diisocyanate, triphenylmethane triisocyanate and dimethyl derivatives thereof, 1,5 naphthalene diisocyanate, polymethylene polyphenol isocyanate, chlorophenylene-2,4-diisocyanate, and the like; and xylylene diisocyanate, and methyl derivatives thereof.

Of these, aromatic polyisocyanates are preferable; the use of diphenylmethane diisocyanate, triphenylmethane triisocyanate, and mixtures thereof is particularly preferable.

Polyol compound

The polyol compound, the component (b), is used together with the polyisocyanate compound to form a polyurethane thereby to harden foundry sand. Examples of useable polyol compounds are: alkylene polyols, preferably alkylene glycols, and ether polyols, preferably polyether polyols, such as ethylene glycol, diethylene glycol, triethylene glycol, tetraethylene glycol, and higher polyethylene glycols; propylene glycol, dipropylene glycol, tripropylene glycol, tetrapropylene glycol, and higher polypropylene glycols; glycerin and diglycerin; ethylene oxide and propylene oxide addition products of glycerin; 1,4-butanediol, 1,2-butanediol, dibutylene glycol, polyoxytetramethylene glycol, and trimethylolpropane; ethylene oxide or/and propylene oxide addition products of trimethylolpropane; sucrose, sorbitol, and pentaerythritol; ethylene oxide or/and propylene oxide addition products of sucrose; ethylene oxide or/and propylene oxide addition products of sorbitol; ethylene oxide addition products or/and propylene oxide addition products of oligomers each having a phenolic hydroxyl group such as bisphenol A, bisphenol F, and the novolak-type phenolic resins. These are used as a single species or in admixture.

Polyols other than those referred to above are usable as long as they are conducive together with polyisocyanates to produce polyurethanes and are susceptible of being modified by alkylphenols in accordance with the present invention.

It is preferable to use an alkylene polyol or an (poly)ether polyol which is at least bifunctional and which has a hydroxyl equivalent of 300 or less, preferably 200 or less, in a quantity, when used in admixture with another polyol, such that the number of the hydroxyl groups thereof comprises at least 50% of the total number of hydroxyl groups in the polyol mixture.

A suitable blending proportion of the component (a) relative to the component (b) is such that the quantity of the isocyanate group of the component (a) is 0.3 to 3 equivalent, preferably 0.6 to 1.5 equivalent with respect to one hydroxyl equivalent of the component (b).

The ol moiety in the term "polyol compound" used in this invention means the ol moiety of alkanol. However, phenolic ol moiety may be possessed together therewith. Furthermore, the polyol compound means a compound having at least two ol moieties in the molecule, and being at least bifunctional means that the polyol compound contains at least two hydroxyl groups in the molecule.

Alkylphenols

For the component (c), which is a compatibilizing agent used for improving the compatibility of the polyol compound and the polyisocyanate compound, an alkyl phenol selected from the group consisting of monoalkyl phenols and dialkylphenols having 2 to 18 carbon atoms in each of the alkyl is preferred.

Specific examples are ethylphenol, butylphenyl, octylphenol, nonylphenol, dodecylphenol, stearylphenol, and the corresponding dialkyl derivatives thereof. Of these, nonylphenol is particularly preferable.

In addition, alkylphenol derivatives can be used as the compatibilizing agent (c), which are: (1) homooligomers of the above-specified alkylphenols, or (2) co-oligomers of the above-specified alkylphenol and a phenol other than the alkylphenol such as, for example, phenol ($C_6H_5OH$) or cresol, produced from condensation with formaldehyde of: (1) the alkylphenol or, (2) a mixture of the alkylphenol and phenol, the quantity of phenol being up to 100 mol percent of the alkylphenol; condensation of formaldehyde such as formalin or paraformaldehyde may take place in the presence of a basic or a weakly acidic catalyst at a temperature of 80° to 150° C. The oligomers may have a methylol group or a dimethylene ether bond.

A suitable quantity in which the component (c) is used is 3 to 150 parts by weight, more preferably 5 to 100 parts by weight, relative to 100 parts by weight of the sum of the weights of the above mentioned components (a) and (b). It has been found that, when this quantity is less than 3 parts by weight, the compatibilizing effect of the component (c) is inadequate and that, when this quantity exceeds 150 parts, the binder strength is impaired.

A binder comprising these components (a), (b), and (c) is blended in a proportion of 0.5 to 5 parts by weight relative to 100 parts by weight of a foundry sand.

Foundry sand and optional ingredients

The foundry sand used includes a sand and inorganic powders used for casting, and its particle size, type, and other particulars are appropriately selected.

For the purpose of lowering the viscosities of the polyol compounds and the polyisocyanate compounds, solvents are ordinarily used.

As solvents for the polyisocyanate compounds, aromatic hydrocarbons such as toluene, xylene, cumene, and diisopropylbenzene are preferred.

Examples of preferably solvents or viscosity controlling agents for the polyol compounds containing alkylphenols and/or derivatives thereof are aromatic hydrocarbons such as toluene, xylene, cumene, ethylbenzene, diisopropylbenzene, diethylbenzene and polyethylbenzenes in the form of such as a distillation residue produced in the production of ethylbenzene by ethylation of benzene and polar solvents such as cyclohexanone, Cellosolve acetate, and butyl Cellosolve.

When it is desired to shorten the time in which the sand mold reaches its strippable strength, a small quantity of a catalyst is added to the polyol component, whereupon rapid hardening is obtained. Examples of suitable catalysts for this purpose are metal salts of naphthenic acids such as cobalt naphthenate; metal salts of fatty acids such as tin octanoate and dibutyltin dilaurate; and tertiary amines such as N-ethyl morpholine, tetramethyldiaminopropane, triethylenediamine, triethylamine, and ethyl morpholinopropionate. A suitable quantity in which this catalyst is used is 5 parts by weight or less relative to 100 parts by weight of the sum of the components (a) and (b).

The binder composition has heat resistance sufficient enough for being used in a sand mold for casting light metals such as aluminum, but for the use at a higher temperature in a sand mold for casting, for example, of iron and steel, it is preferable for increasing heat resistance at the pouring of the molten metal, that the binder composition comprise an oligomer of a phenolic resin such as novolak-type phenolic resin, resol-type phenolic resin, and benzylic ether-type phenolic resin, or an oil-soluble silicon-containing compound such as ethyl orthosilicate, ethyl polysilicate, dimethyl polysiloxane, methyl phenyl polysiloxane and methyl hydrogen polysiloxane.

Formation of the composition

The composition of this invention is mixed with foundry sand by a method such as, for example, the following methods (1) and (2).

(1) The polyol in which the compatibilizing agent has been blended beforehand and the polyisocyanate compound are homogeneously mixed, and thereafter the mixture is mixed with the sand.

(2) The sand and the polyol in which the compatibilizing agent has been blended are homogeneously mixed, and thereafter the polyisocyanate compound is added to and mixed with the resulting mixture with agitation.

In order to indicate more fully the nature and utility of this invention, the following specific examples or practice thereof are set forth, it being understood that these examples are presented as illustrative only and that they are not intended to limit the scope of the invention.

Throughout these examples, quantities expressed in "part(s)" and "percent" are by weight.

EXAMPLE 1

3,500 parts of "Ayaragi" silica sand No. 6 and a mixture of 15.5 parts of dipropylene glycol, 7.8 parts of nonyl phenol, and 15.5 parts of a distillation residue produced in the production of ethylbenzene were homogeneously mixed in a mixer, and, thereafter, into the resulting mixture, 31.1 parts of polymethylene polyisocyanate which is a mixture of diphenylmethane diisocyanate and triphenylmethane triisocyanate, NCO group content being 31.5% was further blended. The resulting mixture was thoroughly mixed by agitation. This mixture was poured into a cylindrical metal mold of 5-cm inner diameter and 13-cm height and was tamped by means of a standard compaction testing machine. The strength of the tamped mixture after one day was measured. The bench life was amply long, being approximately one hour, and the compressive strength after one day was 34.3 kg/cm$^2$.

EXAMPLE 2

3,500 parts of "Ayaragi" silica sand No. 6 and a liquid mixture of 8.7 parts of triethylene glycol, 8.7 parts of tetraethylene glycol, 8.7 parts of nonyl phenol, and 17.4 parts of a distillation residue produced from the production of ethylbenzene were thoroughly mixed in a mixer. Thereafter, into the resulting mixture, 26.5 parts of polymethylene polyisocyanate was further blended, and the resulting mixture was homogeneously mixed by agitation. A sand mold was made with the mixture thus obtained similarly as in Example 1, and its strength was measured. The bench life was approximately 20 minutes, and the compressive strength after one day was 31.0 kg/cm$^2$.

EXAMPLE 3

3,500 parts of "Ayaragi" silica sand No. 6 and a liquid mixture of 3.9 parts of an addition product (average molecular weight of 400) of trimethylolpropane and propylene oxide, 7.7 parts of triethylene glycol, 7.7 parts of tetraethylene glycol, 7.7 parts of nonyl phenol, and 15.5 parts of a distillation residue from the production of ethylbenzene were homogeneously mixed in a mixer. Thereafter, 27.4 parts of polymethylene polyisocyanate was further blended into the mixture thus obtained, and the mixture was homogeneously mixed by agitation. With this mixture, a sand mold was made similarly as in Example 1, and its strength was measured. The compressive strength after one day of this mold was 57.0 kg/cm$^2$, and its bench life was approximately 20 minutes.

SYNTHESIS EXAMPLE 1

220.4 grams (g) of nonyl phenol, 45 g of paraformaldehyde, and 1.5 g of lead naphthenate were caused to react at 105° C. in a four-necked flask provided with an agitator for 3 hours. Thereafter, 94 g of phenol and 80 g toluene were added to the reaction system, which was further caused to react at 125° C. for 3 hours, and 22 cc of water due to the condensation was distilled out. Upon completion of the reaction, toluene and unreacted phenol were removed at 110° C. under 20 to 30 mm Hg. As a result, a yellow oligomer in liquid state was obtained.

EXAMPLE 4

200 parts of the oligomer obtained in the above synthesis Example 1, 150 parts of a distillation residue (EG/HE) comprising triethylene glycol 39.2%, tetraethylene glycol 46.6%, pentaethylene glycol 5.2%, remainder 9.0% obtained from the production of ethylene glycol by hydration reaction of ethylene oxide, and 100 parts of diisopropylbenzene were mixed and homogeneously dissolved. 9.0 parts of the resulting solution and 1.0 part of a 30-percent solution of N-ethyl morpholine were added to and homogeneously mixed with 1,000 parts of "Ayaragi" silica sand No. 6. 11.0 parts of a solution comprising 66.5 parts of polymethylene polyisocyanate sold on the market and 33.5 parts of diisopropylbenzene were further added to and thoroughly mixed with the mold sand. With the resulting mixture, a mold was made similarly as in Example 1. The compressive strength of the mold one hour after it was formed was 35.9 kg/cm$^2$, and its strength after one day was 55.0 kg/cm$^2$.

EXAMPLE 5

200 parts of EG/HE, 100 parts of novolak-type phenolic resin sold on the market, 50 parts of nonyl phenol, and 50 parts of Cellosolve acetate were thoroughly mixed and dissolved. 10 parts of the resulting solution and 1.2 parts of a 50-percent solution of ethyl morpholinopropionate in diisopropylbenzene were added to and thoroughly mixed with 1,000 parts of "Ayaragi" silica sand No. 6. 10.0 parts of a solution comprising 90 parts of polymethylene polyisocyanate sold on the market and 10 parts diisopropylbenzene was added to and thoroughly mixed with the sand. With this sand mixture, a mold was made similarly as in Example 1. The compressive strength of this mold one hour after it was formed was 5.6 kg/cm$^2$, and that one day after forming was 39.9 kg/cm$^2$.

What is claimed is:

1. A binder composition for foundry sands comprising:
   (a) a polyisocyanate;
   (b) a polyol in a quantity such that said composition contains about 0.3 to 3 equivalents of isocyanate group per equivalent of hydroxyl group, and
   (c) a compatibilizing agent in an amount of about 3 to 50 parts by weight per 100 parts by weight of the total weight of said polyisocyanate and said polyol, which is selected from the group consisting of nonylphenol, homooligomer of nonylphenol and formaldehyde, and a cooligomer of nonylphenol and up to 100 mol % based on the mols of nonylphenol in said cooligomer of a compound selected from phenol and cresol, in which cooligomer said nonylphenol, said compound, or said nonylphenol and said compound is condensed with formaldehyde.

2. A binder composition according to claim 1 in which component (b) is a polyol compound selected from the group consisting of alkylene polyols and ether polyols.

3. A binder composition according to claim 2 in which the polyol is a polyether polyol having the hydroxyl equivalent of not higher than 300.

4. A binder composition according to claim 1 in which component (c) is nonylphenol.

5. A binder composition according to claim 1 in which component (a) comprises a polymethylene polyisocyanate which is a mixture of diphenylmethane diisocyanate and triphenylmethane triisocyanate.

6. A binder composition for foundry sands comprising:
   (a) a polymethylene polyisocyanate which is a mixture of diphenylmethane diisocyanate and triphenylmethane triisocyanate;
   (b) a polyol selected from an alkylene polyol and a polyether polyol having a hydroxyl equivalent not higher than 300, in a quantity such that said composition contains about 0.3 to 3 equivalents of isocyanate group per equivalent of hydroxyl group, and
   (c) a compatibilizing agent in an amount of about 3 to 50 parts by weight per 100 parts by weight of the total weight of said polyisocyanate and said polyol, which is selected from the group consisting of nonylphenol, an oligomer of nonylphenol and formaldehyde, and a cooligomer of nonylphenol and up to 100 mol % based on the mols of nonylphenol in said cooligomer of a compound selected from phenol and cresol, in which cooligomer said nonylphenol, said compound, or said nonylphenol and said compound is condensed with formaldehyde.

7. In a binder composition for foundry sand composed of a polyisocyanate and a polyol, the improvement wherein said composition further comprises a compatibilizing agent in an amount of about 3 to 50 parts by weight per 100 parts by weight of the total weight of said polyisocyanate and said polyol, wherein said compatibilizing agent is selected from a member of the group consisting of nonylphenol, a homooligomer of nonylphenol and formaldehyde, and a cooligomer of nonylphenol and up to 100 mols % based on the mols of nonylphenol of a compound selected from phenol and cresol, in which cooligomer said nonylphenol, said compound, or said nonylphenol and said compound is condensed with formaldehyde.

8. A binder composition according to claim 1, 6 or 7 in said compatibilizing agent is said oligomer of nonylphenol.

9. A binder composition according to claim 1, 6 or 7, in which said compatibilizing agent is said cooligomer of nonylphenol.

* * * * *